INVENTOR
HAROLD C. GLASS

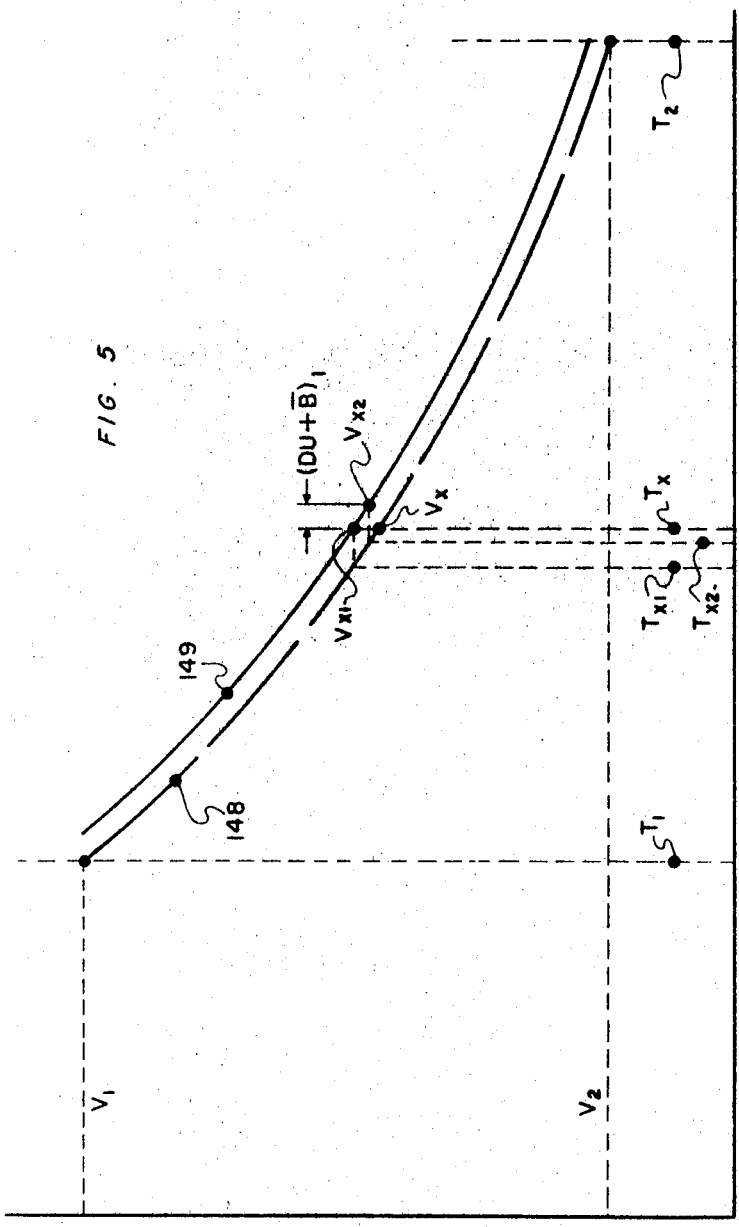
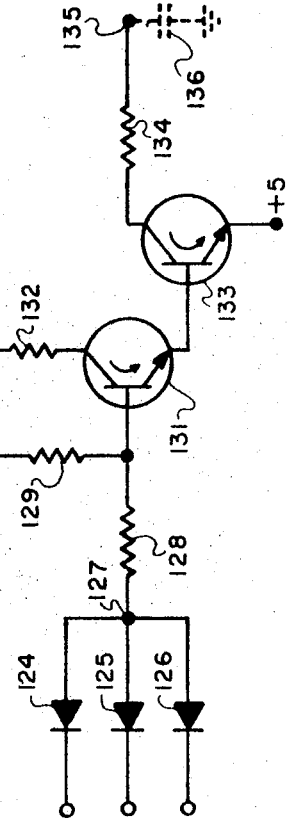

United States Patent Office 3,550,081
Patented Dec. 22, 1970

3,550,081
APPARATUS FOR MEASURING THE HEIGHT OF A PRINTED CHARACTER OR THE LIKE
Harold C. Glass, Fairfax County, Va., assignor to Farrington Electronics, Inc., Springfield, Va., a corporation of Massachusetts
Filed May 25, 1966, Ser. No. 552,793
Int. Cl. G06k 9/04
U.S. Cl. 340—146.3   3 Claims

ABSTRACT OF THE DISCLOSURE

Character height measuring circuitry for providing a control signal corresponding to the height of a character being scanned by an automatic reading device, where said device includes timing circuits for measuring the length of various features of the scanned characters where the timing circuits are adjusted by the above mentioned control signal to adjust the timing period of said timing circuits according to the size of the character being read.

---

The present invention relates in general to proportional control methods and apparatus, and more particularly apparatus for accurately and quickly measuring the size or height of an item to be sensed and generating an output signal representative of said size or height adapting logic utilized for further processing of the item.

The present invention, while being subject to numerous applications as will be apparent to persons skilled in the art to which the invention pertains, is particularly applicable to the field of automatic character sensing equipment and the like, for accurately and quickly measuring the size or height of a character to be read and generating an output signal representative of said size or height adapting logic utilized, for recognition of the character, and the ensuing description will be directed to the use of the present invention in that field. The description of the manner of application of the present invention in the field of automatic character sensing will be adequate to enable persons skilled in the art to understand the manner of its use in other applications.

Automatic character sensing equipment has been heretofore devised for producing output signals identifying characters sensed by the apparatus. Such equipment may briefly be described as apparatus which scans intelligence bearing documents or the like containing items of information such as printed characters, senses the presence and/or absence of bits of each character thereon with reference to a time and/or positional base and relation, produces signals indicative of the presence and absence of such bits of characters within the scanning field, and produces an output at some desired time indicative of the character read. An example of typical automatic character sensing apparatus is disclosed in U.S. Pat. No. 2,897,481 entitled Apparatus for Reading to David H. Shepard. To enable the automatic character sensing equipment to operate more efficiently it is common to provide apparatus to accurately and automatically register the specific character selected for processing, which apparatus is normally referred to as a locator circuit which literally locates the top and/or bottom of a character or group of characters to be read. An example of such locator apparatus is disclosed on pages 238 through 242 in the December 1957 issue of Proceedings of the Eastern Joint Computer Conference, in an article entitled "Automatic Registration in High-Speed Character Sensing Equipment" by A. I. Tersoff. The recognition and other logic within automatic character sensing equipment comprises a number of measuring and/or integrator, or similar type units, that are provided with RC circuits having time periods which when having fixed charge voltages, are adapted for use in recognition of a certain size or height of a character to be read.

Briefly the present invention relates to proportional control apparatus which quickly, accurately and automatically adapts automatic character sensing equipment to read a variety of different character sizes or heights. This is accomplished by the utilization of electrical signals representative of the relative top and bottom of the character to be read, and by employing these signals in a unique manner with the minimum character size or height to be used in a system, a control signal is developed which is used to regulate or adapt the time period for measuring or similar devices used in character recognition according to the size of the character being read, the time period being proportionately changed for characters of different sizes or heights. In other words, as is well known, there are certain kinds of automatic character sensing equipment wherein various features (for example, character strokes) of a character are measured to determine the length thereof, this information being utilized in the ultimate identification of the character. Of course, for a larger character a particular stroke must be longer for a given character than for a smaller version of the same character. In particular, if the stroke length is a determinant in distinguishing the given character from another, the measuring circuitry must be set to provide an indication (that the stroke of predetermined length is present in the character) such that its timing period is longer for a larger character than would be the case for a smaller character. It is the purpose of this invention to provide circuitry for providing a control signal for the timing circuits of the automatic character sensing equipment in order that they can adapt to the various size characters which they are expected to read.

An object of the present invention is the provision of a novel method and apparatus adapted for accurately and quickly measuring the size or height of an item where the item may be any one of a variety of different sizes.

Another object of the present invention is to provide a novel method and apparatus for accurately and quickly measuring any one of a number of different sizes of an item being sensed and generating an output signal indicative of the same adapting logic utilized for further processing of the item.

A further object of the present invention is the provision of a novel method and apparatus for automatically, accurately and quickly adapting automatic character sensing equipment to read a variety of different character sizes or heights.

Yet a further object of the present invention is to provide novel apparatus which automatically, accurately and quickly measures a variety of different character sizes or heights and adapts logic within automatic character sensing equipment to read any one of the variety of different sizes or heights being sensed by proportionately adjusting the logic according to the specific size or height of the character sensed.

Other objects, advantages and capabilities of the present invention will become apparent from the following detailed description, taken in conjunction with the accompanying drawings, showing one proposed embodiment of the invention.

In the drawings:

FIG. 4 is a schematic diagram of the set circuitry shown in block form in FIG. 3.

FIG. 5 is a potential versus time graph disclosing characteristic curves of a measuring unit and the set circuitry.

FIG. 6 shows a series of time related voltage waveforms showing time variant voltages at the corresponding input and output areas indicated alongside the waveforms.

Figure 1:
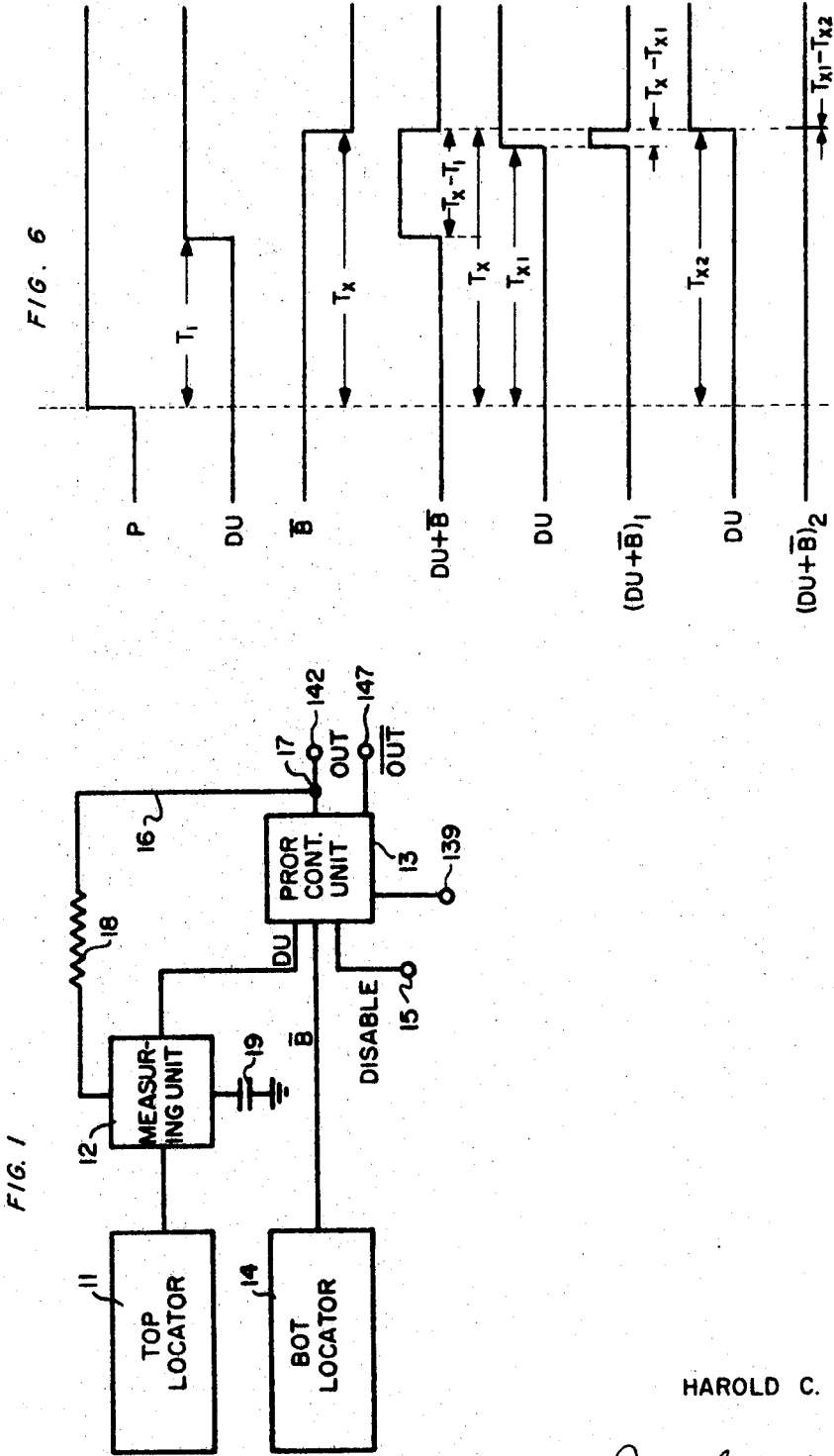
FIG. 1 is a block diagram embodying one manner of utilizing the present invention.

Referring now to the drawings, there is shown in FIG. 1 a character top line locator 11 connected to a measuring unit 12, which may be similar to that disclosed in U.S. application No. 355,149 by D. H. Shepard et al. filed Mar. 25, 1964, (this application having been assigned to the assignee of the present patent application) thence connected to one input of proportional control apparatus 13. A second input to the proportional control apparatus is connected from a character bottom line locator unit 14, while a third input to the proportional control apparatus is connected to terminal 15 which terminal is fed from a disabling circuit to disable the input of the proportional control apparatus. From the output of terminal 17 of proportional control apparatus a wire 16 is fed back to the measuring unit 12 via a timing resistor 18, and a capacitor 19 is tied from the measuring unit to ground the resistor 18 and capacitor 19 constituting an external RC circuit for the measuring unit.

The measuring unit 12 has an RC circuit typical of conventional time measuring and/or integrating units, or similar devices employed in the recognition area and other portions of automatic character sensing equipment, whereby each of the RC circuits in its respective measuring unit is normally designed to provide a fixed time period which, when a fixed potential is applied thereto for charging, relates to a specific size or height of a character to be scanned. A point intermediate resistor 18 and capacitor 19 is tied to a transistor which will switch the measuring unit at a certain threshold voltage ($\Delta V_t$) which we shall assume to be 0 volt. With reference to the graph shown in FIG. 2, we shall assume next that the reset voltage applied to this same point is −5 volts, then from a point S on the graph a curve 121 will be plotted representing the charging characteristics of the capacitor when $V_1$ volts is applied at terminal 17, while a curve 122 will be plotted representing the charging characteristics of the capacitor when $V_2$ volts is applied at terminal 17. It can readily be seen that the 121 curve plot will switch the measuring unit at period $T_1$, being earlier in time than when the 122 curve plot will switch the measuring unit which is at time $T_2$. We shall at this point assume that $T_1$ is a time measurement representative of the minimum character height to be read and $T_2$ is a time measurement representative of the maximum character height to be read.

Figure 3:
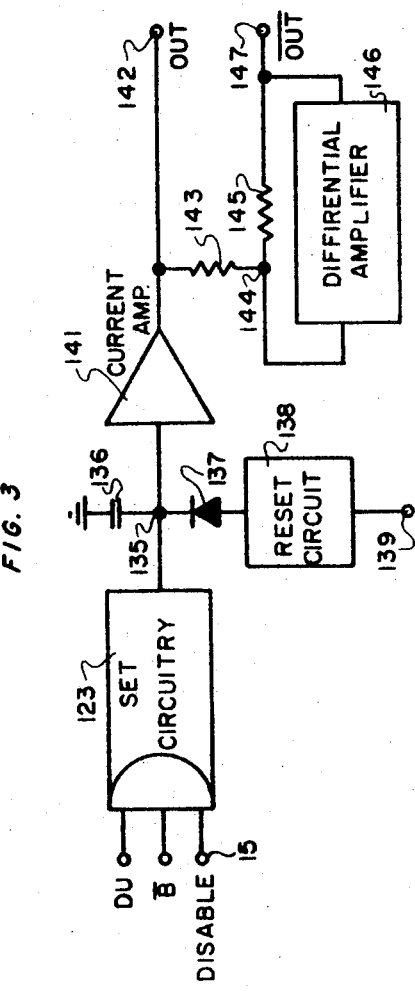
FIG. 3 is a block diagram of the proportional control unit shown in FIG. 1.

In FIG. 3 there is shown a schematic block diagram of the proportional control apparatus 13 shown in FIG. 1, wherein set circuitry 123 is provided with an input AND gate fed by the output of measuring unit 12, the output of the bottom locator 14 and disabling terminal 15. A detailed schematic diagram of the set circuitry is disclosed in FIG. 4 wherein an input AND gate comprises diodes 124, 125 and 126 connected to a common point 127, thence through resistors 128 and 129 to a positive potential of +20 volts. Intermediate resistors 128 and 129 is a connection to the base of transistor 131 which collector is tied to +20 volts via resistor 132. The transistor 131 emitter is connected to the base of transistor 133 which emitter is tied to a +5 volt potential and which collector is connected to output terminal 135 by way of resistor 134.

The output terminal 135 of set unit 123 in FIG. 3 is then connected to a capacitor 136 tied to ground and is also connected to a reset circuit 138 via diode 137, the reset circuit being tied to a reset terminal 139. Point 135 is further connected to a unity voltage, high gain current amplifier 141 having a very high input impedance, and a low output impedance at output terminal 142. Output terminal 142 is connected to resistor 143 which in turn is tied to output terminal 147 by way of resistor 145 through one path and by way of a conventional differential amplifier 146 through another path, to produce at output terminal 147 a potential being the negative value of the potential at output terminal 142, point 144 the junction intermediate resistors 143 and 145, having a potential of zero volts.

In FIG. 5 there is plotted a graphical representation of measurement time versus applied control voltage at point 17 from $V_1$ through $V_2$ in the measuring unit, where the measurement time is the time it takes from zero to $T_1$ or $T_2$ for capacitor 19 to be charged, whereas the following formula is utilized:

$$t = RC \ln \frac{V}{V - \Delta V}$$

It may be readily observed that the curve 148 characteristic of the measuring unit is nonlinear in form. The nonlinear curve 149 also shown in FIG. 5 is characteristic of the set circuitry 123 as it will charge capacitor 136 which set circuitry has been designed so that this latter curve 149 will closely match yet fall slightly above curve 148.

Figure 2:
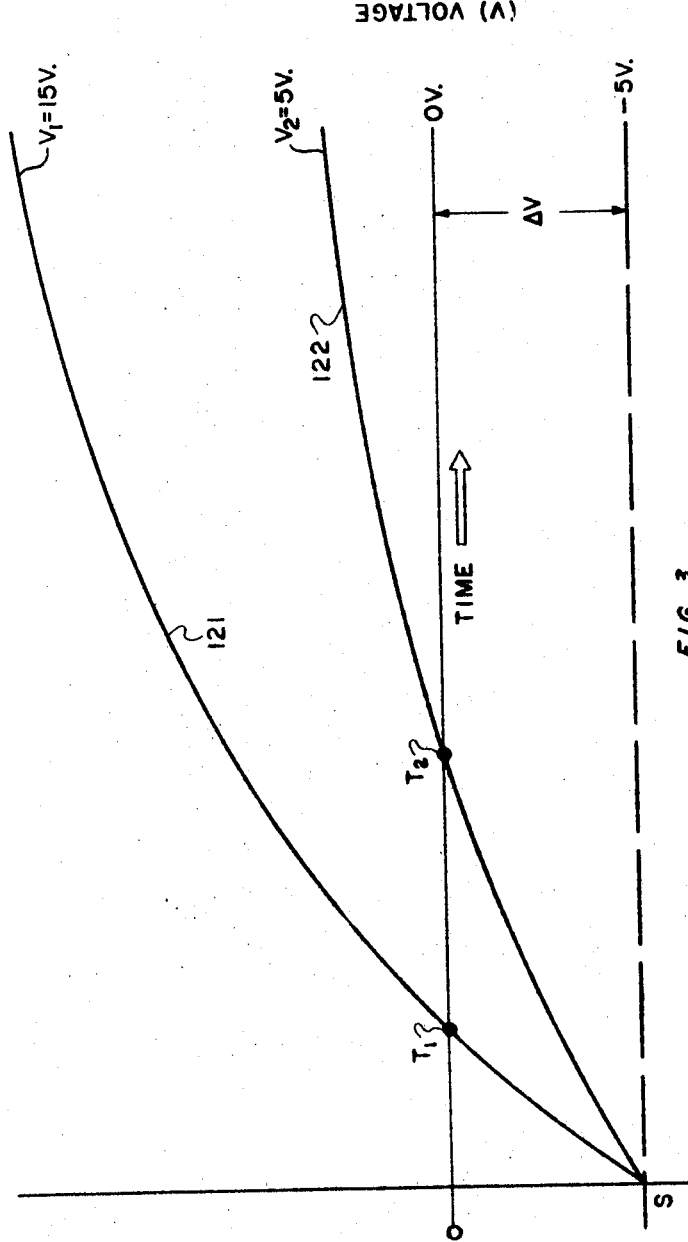
FIG. 2 is a potential versus time graph disclosing the different times obtained by employing different voltages for charging a capacitor.

In operation, we shall first assume that measuring unit 12, shown in FIG. 1, is initially set to provide a delay period $T_1$ which is equivalent to the duration of an electrical signal from the scanner representative of the smallest size or height of a character to be read. Furthermore, we shall assume that the charge on capacitor 136, shown in FIG. 2, is reset to +15 volts or $V_1$ via reset circuit 138. Next we shall assume that the top and bottom of a character to be scanned has been located whereby in FIG. 6 the leading edge of waveshape P is representative of when the top of the character has been located, and the trailing edge of waveshape $\overline{B}$ is representative of when the bottom of the character has been located, the duration from the top to the bottom of the two signals being $Tx$.

The measuring unit will then measure off a time period beginning with the leading edge of the input to it from the top locator 11 and produce an output at $T_1$. Thus the output of the measuring unit is represented by the waveshape DU. The signals DU and $\overline{B}$ are fed to the input AND gate of set circuitry 123 which is enabled to produce an output waveshape $DU + \overline{B}$ which has a period of $Tx - T_1$.

The input signal to the AND gate configuration comprising diodes 124, 125 and 126 will have an output signal of a time duration equivalent to $Tx - T_1$, which signal will positively bias the base of NPN transistor 131 acting as an emitter follower, to cause a current flow in the direction from the collector to the emitter, thus biasing the base of NPN transistor 133, similarly causing current to flow from the collector to the emitter and simultaneously discharging capacitor 136 for the period $Tx - T_1$ following the curve 149 in FIG. 5 according to which curve the set circuitry has been designed. The capacitor 136 will therefore be discharged to the value $Vx_1$ which is slightly above the desired value $Vx$, this value $Vx_1$ being the output of the current amplifier 141 and appearing at terminal 142 while its negative value $\overline{Vx_1}$ is appearing at the output terminal 147 of differential amplifier 146. The voltage value $Vx_1$ is thus used to charge capacitor 19 of measuring unit 12 in FIG. 1, so that during the successive scanning frame, where $\overline{P}$ and $\overline{B}$ are the same as during the previous frame, the output of the measuring unit being at $Tx_1$ time which in FIG. 5 on curve line 148, is the value of the time period that $Vx_1$ on measuring unit 12 will cause to be formed. Accordingly the $(DU + \overline{B})_1$ will be the period that capacitor 136 is further discharged downwardly along curve 149 to the value $Vx_2$. Therefore, voltage $Vx_2$ will be applied to the measuring unit during the successive frame causing an output at $Tx_2$ for a successive signal input P.

This cyclic operation can be continued until a very accurate voltage will appear at terminal 142 in FIG. 3, this voltage being the same to control all the measuring and/or integrator, or similar type units in the recognition and other necessary portions of the automatic character sensing machine, thereby providing a device for accurately and quickly measuring a variety of different sizes or heights of information to be scanned. It may be readily seen that by having the characteristic curve 149 designed to fall slightly above curve 148 which is characteristic of the measuring unit being employed, the defect of overshooting of the actual and ultimate voltage desired to control the measuring unit may be easily avoided, thus obviating the need for any circuitry to overcome such a defect.

It is noted that by use of the present invention one may obtain an accurate control voltage within two to three scanning frames. If, for example, the curve 149 is designed to be ten percent less than the values followed along curve 148 then after the first scanning frame ninety percent of the character height will be determined, and ninety-nine percent of the character height will be determined by the end of the second scanning frame. If further accuracy should be desired the curve 149 might be made to more closely follow curve 148, or subsequent scanning frames might be used to obtain an accurate voltage signal.

While only one preferred embodiment of the invention has been particularly shown and described, it is apparent that other modifications may be made in the invention without departing from the spirit and scope thereof, and it is desired, therefore, that only such limitations shall be placed thereon as are imposed by the prior art and are set forth in the appended claims.

It is claimed:

1. In circuitry for adjusting a potential to be directly related to the extent of an electrical signal representative of the size of an item being processed where successive items may vary in size comprising means for sensing the item to be processed and producing signals indicative of a first and second boundary of the item in one dimension, a measuring unit comprising RC circuitry having a selected operational characteristic, RC curve related to time, a control unit having an operational characteristic RC curve which will almost match yet varies from said selected characteristic RC curve at any one point by a predetermined amount, means for applying a first boundary signal to the measuring unit and delaying the leading edge of the first boundary signal to produce a measuring unit output signal, the time period of which is initially indicative of the minimum size of said item to be processed, means for gating the output of the measuring unit and a second boundary signal to produce a control unit output potential indicative of a value slightly less than the actual item size related to said predetermined amount, and means for applying the control unit output potential back to the measuring unit to adjust its time period subtracted from input signals.

2. Circuitry according to claim 1, including means for providing an initial potential at the output of said control unit which is related to the time period indicative of the minimum size of an item to be processed, and means for discharging the initial potential in accordance with the input signal applied to the control unit.

3. In a scanning system for scanning different size characters on a document comprising processing apparatus to provide output signals indicative of the characters, said process apparatus comprising at least one RC circuit with a selected time versus potential characteristic RC curve, means responsive to the height of a character being scanned for producing singals indicative of a first and second location each defining one of two boundaries of the character height, measuring means having a capacitor and a selected characteristic RC curve and responsive to a first location signal to delay the leading edge thereof, the time period of the measuring means output signal being initially indicative of the minimum height of a character to be read, control means having an output time versus potential characteristic RC curve which at any one point slightly differs from said selected characteristic RC curve, the output of said control means having a capacitor initially charged to a potential indicative of the minimum height of a character to be processed, the control means comprising an input AND gate responsive to a second location signal and the output of the measuring means to discharge the control unit capacitor in accordance with the input signal enabled by the AND gate, the control means output potential on said control unit capacitor adjusting the potential on said measuring means capacitor to a value slightly less than that relative to the actual character height for preventing overshoot, the measuring means being so adjusted by the lower output potential on the capacitor to increase the time period subtracted from a successive first location signal applied thereto.

References Cited

UNITED STATES PATENTS

| 2,674,917 | 4/1954 | Summerhayes. | |
|---|---|---|---|
| 3,141,124 | 7/1964 | Atherton | 320—1 |
| 3,275,834 | 9/1966 | Stevens. | |
| 3,345,908 | 10/1967 | Jensen | 250—219X |
| 3,350,505 | 10/1967 | Bakis | 340—146.3X |

MAYNARD R. WILBUR, Primary Examiner

L. H. BOUDREAU, Assistant Examiner

U.S. Cl. X.R.

320—1